United States Patent
Wu et al.

(10) Patent No.: US 10,125,546 B2
(45) Date of Patent: Nov. 13, 2018

(54) APPARATUS AND METHODS FOR GEOSTEERING

(71) Applicant: Halliburton Energy Services, Inc., Houston, TX (US)

(72) Inventors: Hsu-Hsiang Wu, Sugar Land, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 463 days.

(21) Appl. No.: 14/770,038

(22) PCT Filed: May 2, 2013

(86) PCT No.: PCT/US2013/039263
§ 371 (c)(1),
(2) Date: Aug. 24, 2015

(87) PCT Pub. No.: WO2014/178871
PCT Pub. Date: Nov. 6, 2014

(65) Prior Publication Data
US 2016/0002977 A1    Jan. 7, 2016

(51) Int. Cl.
*E21B 47/022* (2012.01)
*E21B 47/024* (2006.01)
(Continued)

(52) U.S. Cl.
CPC ............... *E21B 7/04* (2013.01); *E21B 44/00* (2013.01); *E21B 47/022* (2013.01);
(Continued)

(58) Field of Classification Search
CPC ...... E21B 47/022; E21B 47/024; E21B 47/12; E21B 7/04; E21B 44/00; G01V 3/28; G05B 15/02
See application file for complete search history.

(56) References Cited

U.S. PATENT DOCUMENTS

| 8,954,280 B2 | 2/2015 | Li et al. | |
| 2003/0094280 A1* | 5/2003 | Sinclair | G01V 3/30 166/250.01 |

(Continued)

FOREIGN PATENT DOCUMENTS

| CA | 2795219 A1 | 10/2011 |
| CN | 102870014 A | 12/2015 |
| EP | 2565685 A2 | 3/2013 |
| WO | WO-2011129828 A1 | 10/2011 |
| WO | WO-2014178871 A1 | 11/2014 |

OTHER PUBLICATIONS

"German Application Serial No. 112013007019.7, Examination Report dated Jul. 20, 2017", 7 pages.

(Continued)

*Primary Examiner* — Bryan Bui
(74) *Attorney, Agent, or Firm* — Gilliam IP PLLC

(57) ABSTRACT

Various embodiments include apparatus and methods to generate geosignal responses. Geosignal responses may be generated that include a representation of a determination of variation between a XX coupling component and a YY coupling component from acquired signals. Such geosignals may be used to 5 address a blindspot problem suffered in conventional geosteering in a drilling condition where the logging tool is located at layered formations with symmetric resistivity profiles. Additional apparatus, systems, and methods are disclosed.

20 Claims, 15 Drawing Sheets

(51) Int. Cl.
  *E21B 47/12* (2012.01)
  *E21B 7/04* (2006.01)
  *G01V 3/28* (2006.01)
  *E21B 44/00* (2006.01)
  *G05B 15/02* (2006.01)
(52) U.S. Cl.
  CPC ............ *E21B 47/024* (2013.01); *E21B 47/12* (2013.01); *G01V 3/28* (2013.01); *G05B 15/02* (2013.01)

(56) References Cited

U.S. PATENT DOCUMENTS

| | | | |
|---|---|---|---|
| 2005/0083063 | A1 | 4/2005 | Omeragic et al. |
| 2008/0078580 | A1 | 4/2008 | Bittar |
| 2009/0015261 | A1 | 1/2009 | Yang et al. |
| 2009/0224764 | A1 | 9/2009 | Bittar |
| 2009/0230968 | A1 | 9/2009 | Bittar et al. |
| 2011/0133740 | A1 | 6/2011 | Seydoux et al. |
| 2011/0140701 | A1 | 6/2011 | Legendre et al. |
| 2012/0199394 | A1 | 8/2012 | Bittar et al. |
| 2012/0253676 | A1 | 10/2012 | Dong et al. |
| 2012/0283951 | A1 | 11/2012 | Li et al. |
| 2014/0350858 | A1* | 11/2014 | Donderici ................. E21B 7/04 702/7 |

OTHER PUBLICATIONS

"Canadian Application Serial No. 2,907,638, Second Office Action dated Jun. 7, 2017.", 4 pages.

"Chinese Application Serial No. 201380074920.1; First Office Action dated Jul. 26, 2017", 5 pages.
"Gulf Cooperation Council Application Serial No. 2014-27082, First Examination Report dated Jul. 20, 2017.", 5 pages.
"International Application Serial No. PCT/US2013/039263, International Search Report dated Jan. 22, 2014", 4 pgs.
"International Application Serial No. PCT/US2013/039263, Written Opinion dated Jan. 22, 2014", 7 pgs.
"Venezuela Application Serial No. 2014-000551, Office Action dated Jul. 4, 2014", 1 pg.
"Canadian Application Serial No. 2,907,638, Office Action dated Sep. 16, 2016", 3 pgs.
"Mexican Application Serial No. MX/a/2015/013287, Office Action dated Oct. 4, 2016", 2 pages.
"Mexican Patent Application No. MX/a/2015/013287; Office Action dated Mar. 30, 2017", 2 pages.
"Australian Application Serial No. 2013388091, First Examiner Report dated May 20, 2016", 2 pgs.
"European Application Serial No. 13883529.3, Extended European Search Report dated Apr. 21, 2016", 5 pgs.
"United Kingdom Application Serial No. 1515224.2, Response filed Feb. 10, 2016 to Office Action dated Dec. 9, 2015", 12 pgs.
"International Application Serial No. PCT/US2013/039263, International Preliminary Report on Patentability dated Nov. 12, 2015", 9 pgs.
"United Kingdom Application Serial No. 1515224.2, Office Action dated Dec. 9, 2015", 1 pg.
Chinese Application Serial No. 201380074920.1; Second Office Action; dated Apr. 13, 2018, 16 Pages.

\* cited by examiner $(\beta_j = \beta_i + 180°)$

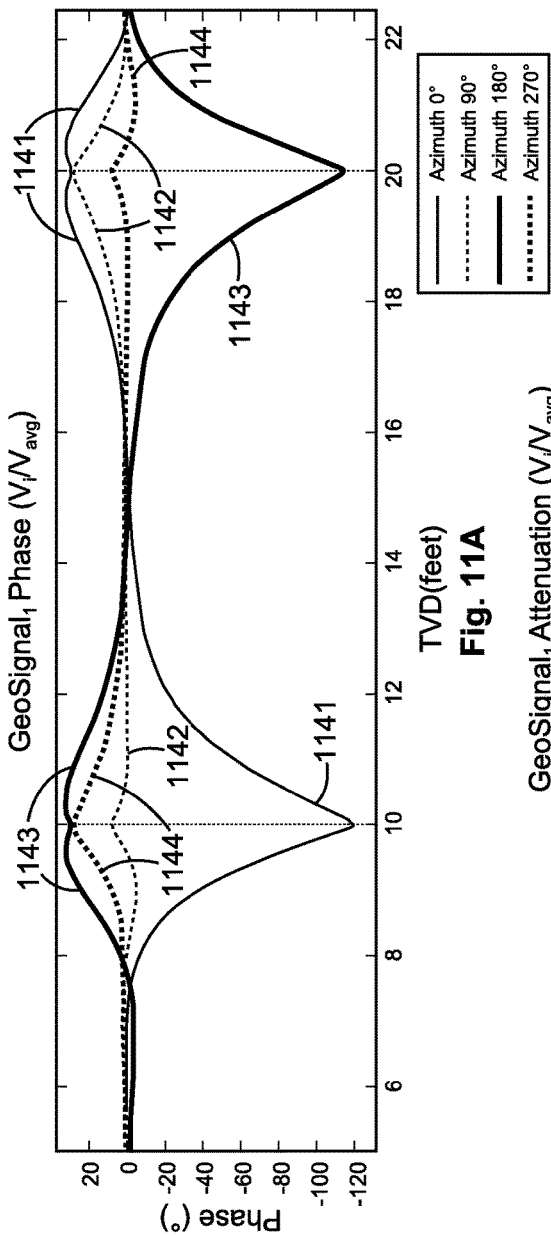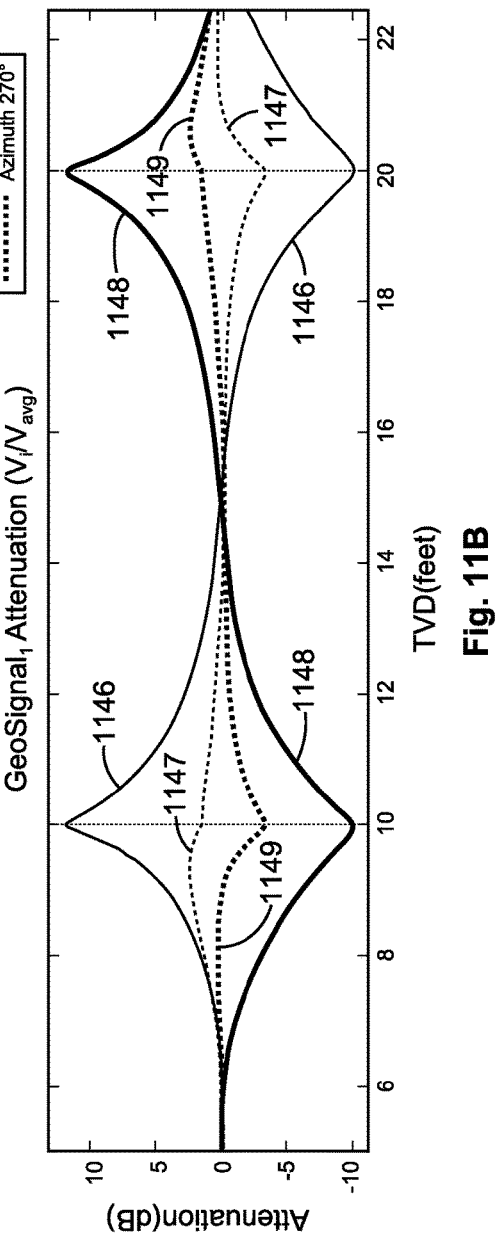
Fig. 11A
Fig. 11B

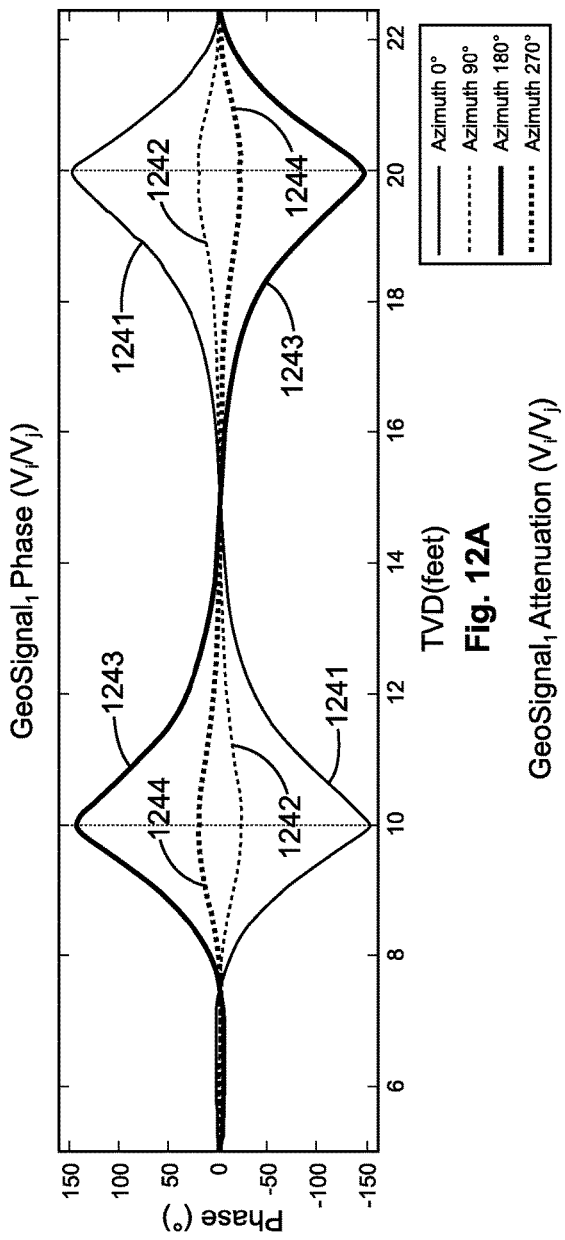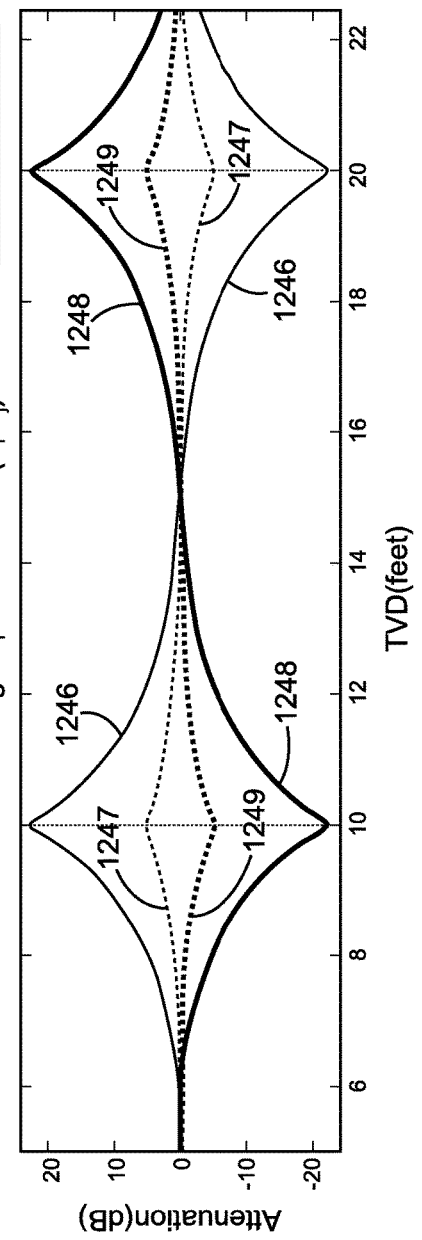
Fig. 12A
Fig. 12B

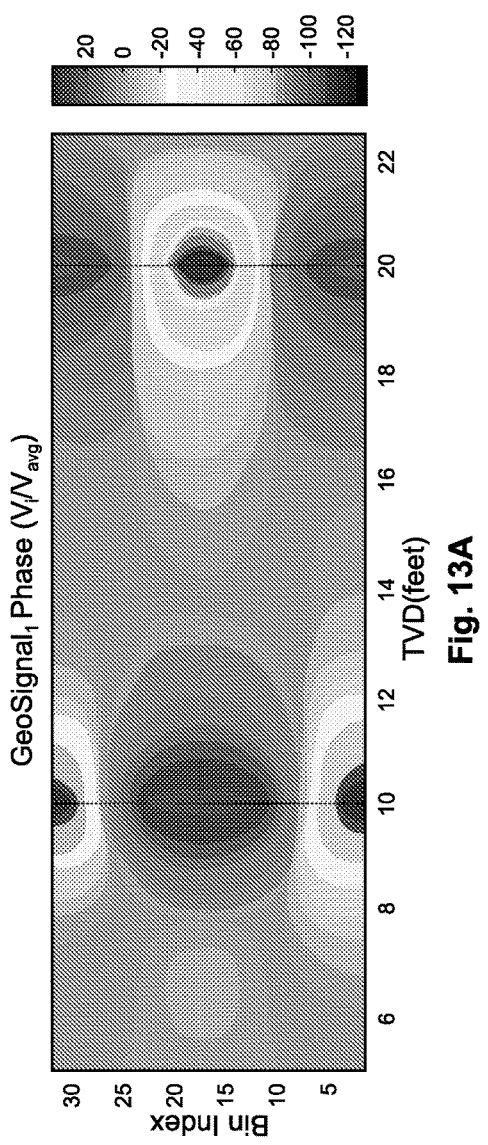
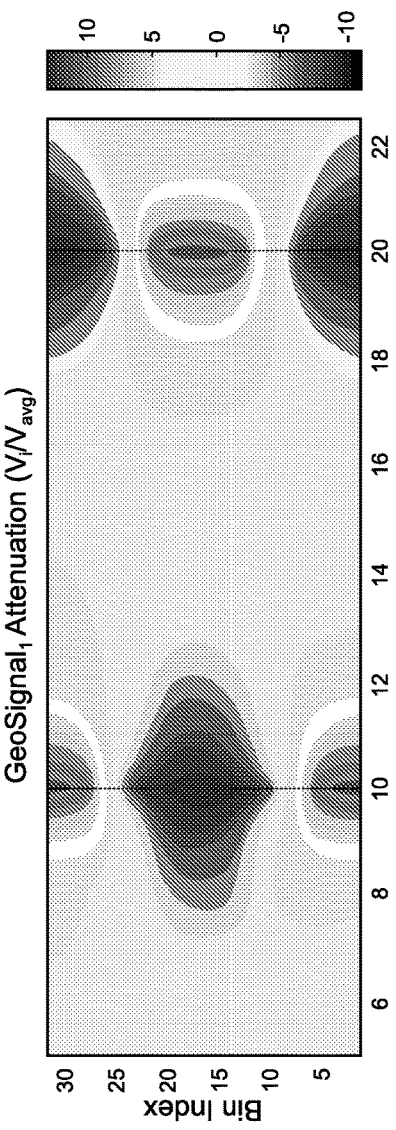
Fig. 13A
Fig. 13B

APPARATUS AND METHODS FOR GEOSTEERING

PRIORITY APPLICATIONS

This application is a U.S. National Stage Filing under 35 U.S.C. 371 from International Application No. PCT/US2013/039263, filed on 2 May 2013, and published as WO 2014/178871 A1 on 6 Nov. 2014, which application and publication are incorporated herein by reference in their entirety.

TECHNICAL FIELD

The present invention relates generally to apparatus and methods for making measurements related to oil and gas exploration.

BACKGROUND

In drilling wells for oil and gas exploration, understanding the structure and properties of the associated geological formation provides information to aid such exploration. In addition, it may be critical to acquire optimal wellbore placement to enhance maximum oil production. An azimuthal directional electromagnetic (EM) resistivity tool has been implemented to actively adjust borehole position so that an optimized well plan can be achieved. A related application of such a tool is geosteering, which is an intentional control to adjust drilling direction. A geosignal is a signal or representation that can be used for geosteering. Azimuthal geosignal responses can be used to guide well path orientation in real-time as well as steer the well towards a desired formation zone It is widely known that existing azimuthal EM tools used in geosteering suffer a "blind-spot" problem in a drilling condition where the logging tool is located at layered formation media with symmetric resistivity profiles. In such circumstances, geosignal responses of current (conventional) directional EM tools become very insensitive to such layered formation effects so that petrophysicists may misinterpret the formation geology based on conventional geosignal signals. An example of an extremely difficult formation case includes a tool located in the middle layer of a symmetric 3-layer formation resistivity profile, where the middle layer has a higher resistivity value than both the upper and the lower layers. In this drilling condition, the geosignal is very weak and petrophysicists may make the wrong impression that the tool is drilling in a homogenous formation medium.

WO 2011/129828 A1 discusses various embodiments that include apparatus and methods of processing and geosteering with respect to well logging. Methods and associated apparatus can include acquiring signals generated from operating a tool rotating in a borehole of a well, where the tool includes a receiver antenna tilted with respect to the longitudinal axis of the tool and two transmitter antennas. The acquired signals can be processed with respect to a direction in the rotation of the tool to determine properties associated with a formation and/or to determine a geosignal for geosteering a drilling operation. WO 2011/129828 A1 includes discussion of converting acquired signals to coupling components.

US Patent Publication 2008/0078580 relates to systems and methods for performing bed boundary detection and azimuthal resistivity logging with a single tool. Some method embodiments include logging a borehole with an azimuthally-sensitive resistivity logging tool; deriving both a resistivity log and a boundary detection signal from measurements provided by said tool; and displaying at least one of the boundary detection signal and the resistivity log. The resistivity log measurements may be compensated logs, i.e., logs derived from measurements by one or more symmetric transmitter-receiver arrangements. Though symmetric arrangements can also serve as the basis for the boundary detection signal, a greater depth of investigation can be obtained with an asymmetric arrangement. Hence the boundary detection signal may be uncompensated.

BRIEF DESCRIPTION OF THE DRAWINGS

FIGS. 11A-11B show geosignal responses of a first kind of the tool configuration in FIG. 10 in the formation model in FIG. 6A, in accordance with various embodiments.

FIGS. 12A-12B show geosignal responses of a second kind of the tool configuration in FIG. 10 in the formation model in FIG. 6A, in accordance with various embodiments.

FIGS. 13A-13B show geosignal images of a first kind of the tool configuration in FIG. 10 in the formation model in FIG. 6A, in accordance with various embodiments.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Control of geosteering can be based on downhole logging measurements to increase the borehole's exposure to a hydrocarbon-bearing formation (the "payzone"). Such geosteering can be used to maintain a wellbore within a region that provides a material that is a source of economic value. Capabilities of geosignals are useful in geosteering to optimize well placement for maximum oil recovery. Geosignals, indicative of the direction of drilling tools downhole, are capable of detecting boundaries. In addition, the geosignal can be used for the calculation of distance to bed boundaries. Apparatus and processing schemes, as discussed herein, allow for the generation of geosignals.

Figure 1:
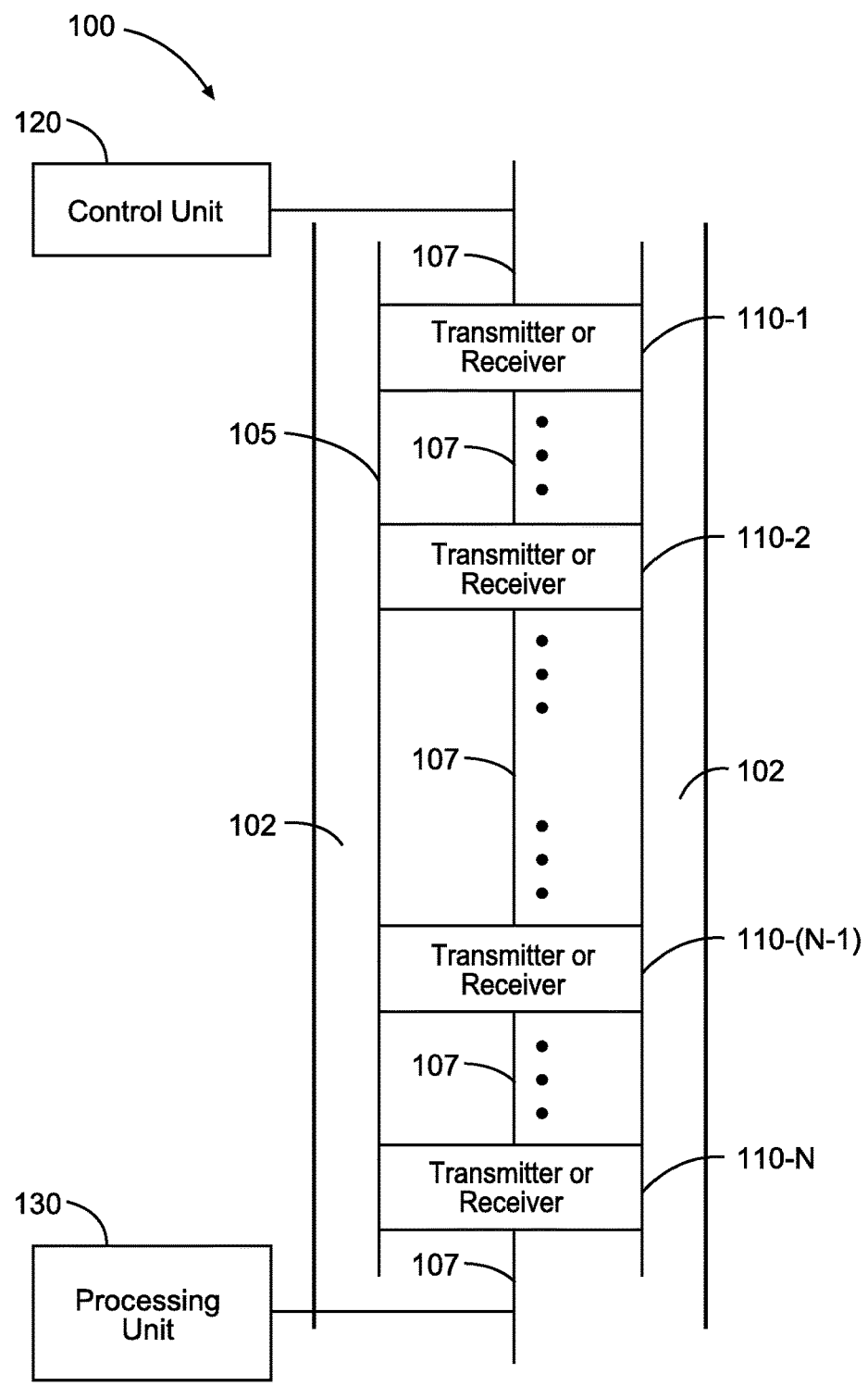
FIG. 1 shows a block diagram of an embodiment of an example apparatus having a tool structure operable in a borehole to determine formation properties, in accordance with various embodiments.

FIG. 1 shows a block diagram of an embodiment of an apparatus 100 having a tool structure 105 operable in a borehole to determine formation properties. The tool structure 105 includes an arrangement of sensors 110-1, 110-2 . . . 110-(N−1), 110-N along a longitudinal axis 107 of tool 105. Each sensor 110-1, 110-2 . . . 110-(N−1), 110-N can be tilted with respect to the longitudinal axis 107. A tilted sensor is one that is disposed on the tool structure 105 at a selected angle that is greater than tolerance angles associated with a sensor attached placed in parallel or perpendicular to the longitudinal axis 107. The term "tilted" indicates that the plane of the sensor is not perpendicular to the longitudinal axis 107. A tilt angle can be measured from the longitudinal axis 107 to a normal to the plane of the sensor, and can be referred to as a positive or negative angle less than 90°. Typically, the tilt angle ranges in absolute value from 5° to 85°. The arrangement of sensors can include one or more combinations of transmitting sensors and receiving sensors having tilt angles. A configuration of the transmitting sensors and receiving sensors can form a symmetric sensor tool.

The tool structure 105 can include one or more sets of transmitting sensors and receiving sensors arranged symmetrically and one or more sets of transmitting sensors and receiving sensors that are not arranged symmetrically. A symmetric or non-symmetric arrangement can be realized by selectively controlling selected ones of the sensors 110-1, 110-2 . . . 110-(N−1), 110-N for transmitting and selected ones of the sensors 110-1, 110-2 . . . 110-(N−1), 110-N for receiving. Operation of a symmetric sensor tool allows for structural compensation to generate compensation signals that can be processed to determine formation parameters. The processing of selected signals received correlated to generating selected signals can produce geosignals that may be used to provide accurate readings for anisotropic measurements and accurate evaluation of formations in both wireline applications and measurements-while-drilling (MWD) applications such as logging-while-drilling (LWD) applications.

In various embodiments, arrangements of sensors as taught herein can include the use of a variety of sensors. For example, both transmitting sensors and receiving sensors can be antennas. Sensors can be realized as one of a coil, a solenoid, a magnetometer, or other similar sensor. In case of coil sensors, a tilt angle may be produced by winding the coil with an angle. In case of a solenoid, the elevation angle of the core may be adjusted for the desired tilt angle. In case of a magnetometer, the device may be mounted onto or into the tool structure 105 with the desired tilt angle.

The apparatus 100 can include a control unit 120 that manages the generation of transmission signals and the collection of received signals corresponding to the transmission signals. The control unit 120 can be structured to be operable to select specific ones of the sensors 110-1, 110-2 . . . 110-(N−1), 110-N as transmitting sensors and receiving sensors to form a symmetric sensor tool. The control unit 120 can control the firing of selected transmitting sensors and the acquisition of signals from selected receiving sensors such that the measured signals can be used to generate compensated signals related to coupling components as taught herein. The firing of a sensor means the generation of a transmission signal from the sensor. The generation of transmission signals can be conducted to provide signals of different frequencies. Each of the different frequencies can be associated with a different transmitting sensor. The collected received signals can be provided to a processing unit 130 in appropriate format to perform numerical inversion on data generated from signals acquired at receiving sensors in the arrangement of sensors 110-1, 110-2 . . . 110-(N−1), 110-N.

The processing unit 130 can be structured to process measured signals to generate geosignals. The scheme for generating the geosignals can be performed in accordance with various embodiments discussed herein. The processing unit 130 can apply an inversion process to generate formation parameters. Performing an inversion operation or inversion operations can include using a forward model and/or a library. A forward model provides a set of mathematical relationships for sensor response that can be applied to determining what a selected sensor would measure in a particular environment, which may include a particular formation. A library can include information regarding various formation properties that can be correlated to measured responses to selected probe signals. Performing an inversion operation or inversion operations can include performing an iterative process or performing a pattern matching process.

The processing unit 130 can be structured to process measured signals to generate geosignals. These geosignals can be based on sensitivity of XX and YY coupling components. Geosignals based on XZ and ZX coupling components also can be generated. Drilling operations, such as but not limited to geosteering, can be conducted using the geosignals based on the sensitivity of XX and/or YY coupling components. Use of the geosignals based on the sensitivity of XX and YY coupling components can include evaluation in combination with geosignals based on XZ and/or ZX coupling components. The processing unit 130 can be arranged as a separate unit from the control unit 120 or integrated with the control unit 120. Either or both of the processing unit 130 and the control unit 120 can be constructed as distributed components.

In various embodiments, the measurement tool 105 with the processing unit 130 or combination of the control unit 120 and the processing unit 130 can be arranged to determine and generate XX and YY coupling components that include sensitivity of both XX and YY coupling components to differentiate between null signals of conventional tools in a "blind-spot" and in homogeneous medium. The sensitivity of XX and YY coupling components may be provided by processing to decouple coupling components of a coupling matrix that relates signals received at receiving sensors of the tool 105 to signals transmitted by transmitting sensors of the tool 105, by arrangement of transmitting sensors and receiving sensors that directly provides decoupled XX and YY coupling components, or by arrangement of transmitting sensors and receiving sensors that provides decoupled XX and YY coupling components with limited processing. Different geosignals can be generated according to different combinations of coupling components that utilize XX and YY sensitivity to resolve "blind-spot" issues. Such combinations may include, but are not limited to, generating an arithmetic mean that can include a determination of variation between XX and YY coupling components, or a geometric mean that can include a determination of variation between XX and YY coupling components, or other combinations taught herein. The determination of a variation or amount of variation can be used to identify boundaries between different formation layers.

In various embodiments, processing techniques along with an EM tool equipped with both tilted transmitter(s) and tilted receiver(s) can be implemented to provide geosignal signals. Geosignal responses can be utilized to differentiate formation models among several cases that are unable to be resolved by conventional azimuthal EM tools. The new techniques can remove the "blind-spot" problem and better assist petrophysicists to understand formation geology based on various geosignal responses sensitive to specific azimuthal orientations. These techniques may meet particular needs in advanced geosteering applications.

Figure 2:
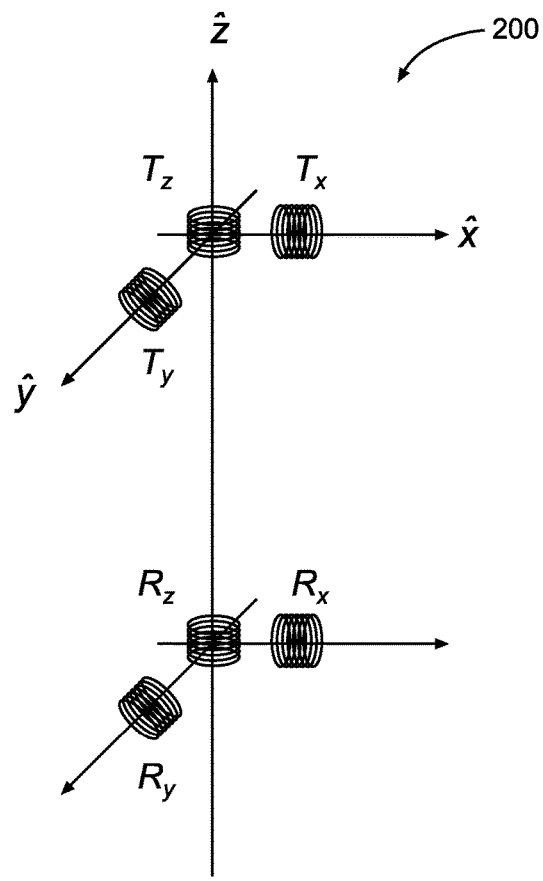
FIG. 2 shows a representation of an example antenna configuration of a multi-component electromagnetic logging tool, in accordance with various embodiments.

FIG. 2 shows an antenna configuration 200 for a multi-component electromagnetic logging tool. Discussions of such a configuration of a multi-component electromagnetic logging tool can be found in International Publication WO2011/129828. The magnetic field h in the receiver coils can be represented in terms of the magnetic moments m at the transmitters and a coupling matrix C as:

$$h = Cm \quad (1)$$

Equation (1) can be expressed as:

$$\begin{bmatrix} H_x \\ H_y \\ H_z \end{bmatrix} = \begin{bmatrix} C_{xx} & C_{xy} & C_{xz} \\ C_{yx} & C_{yy} & C_{yz} \\ C_{zx} & C_{zy} & C_{zz} \end{bmatrix} \begin{bmatrix} M_x \\ M_y \\ M_z \end{bmatrix} \quad (2)$$

where $M_X$, $M_Y$, and $M_Z$ are the magnetic moments of the transmitted signal emitted by transmitters $T_X$, $T_Y$, and $T_Z$, respectively. $H_X$, $H_Y$, and $H_Z$ are the magnetic fields which are proportional to the received signal at the receiver antennas $R_X$, $R_Y$, and $R_Z$, respectively. For the antenna configuration of FIG. 2, nine absolute or differential measurements can be obtained when an antenna is fired and a signal is measured at each of the three receivers respectively. These nine measurements enable the determination of the complete coupling matrix C. The coupling matrix C has components, $C_{IJ} = a_{IJ} V_I^J$, where I is the index of receiver $R_X$, $R_Y$, and $R_Z$, J is the index of receiver $T_X$, $T_Y$, and $T_Z$, $a_{IJ}$ is a constant coefficient determined by the tool design, $V_I^J$ is a coupling component representing the signal amplitude and phase shift measured by receiver I in response to the firing of transmitter J.

Figure 3:
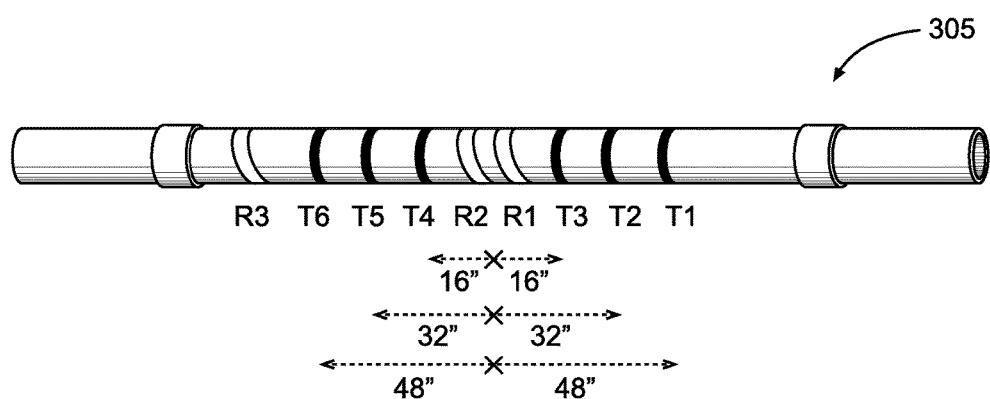
FIG. 3 shows a tool operable an azimuthal deep resistivity sensor, in accordance with various embodiments.

FIG. 3 shows a tool 305 operable as an azimuthal directional resistivity EM tool. The tool configuration 305 may be operable to provide azimuthal deep sensing. With tilt receivers (R1, R2, and R3), the tool configuration enables azimuthal sensitive measurements. The measurements made by the tool 305 are associated with coupling components of $V_z^z$ and $V_x^z$ in FIG. 2, providing azimuthal resistivity and geosignal responses to detect bed boundary while tool is rotated during drilling operation. The configuration and operation of the tool 305 are discussed in US Patent Publication 2008/0078580. The tool 305 can acquire measurements in a number of discrete directions, called bins or bin directions, allowing for a number of different depths of investigation to determine distance and direction to multiple bed boundaries. For example, the tool 305 can be arranged with transmitters and receivers to use 32 discrete directions and 14 different depths of investigation. However, other arrangements of tools similar to the tool 305 can use more or less than 32 discrete directions and/or more or less than 14 different depths of investigation.

The tool 305 includes transmitters T1-T6 and tilted receivers R1-R3 to measure resistivity that can be structured to provide an azimuthal resistivity array by activating different transmitters in combination with selecting appropriate titled receivers to collect responses from activating the different transmitters. The transmitters spaced apart at different distances with respect to the tilted receivers allow investigation of a formation at different distances from tool 305 including relatively deep probing. Deeper readings provided by the tool 305 can improve reaction time, allowing for increased drilling speed. The arrangement of tilted sensors also provides for azimuthal measurements. The azimuthal readings can provide for derivation of anisotropy resistivity values, $R_h$ (horizontal) and $R_v$ (vertical) and dip. The azimuthal measurements may be conducted for a number of bins. For example, the number of bins can be set at 32 bins. The number of bins can be set to another number.

The transmitters and receivers of the tool 305 can be spaced to provide a set of separation distances. For example, the upper transmitters can be spaced apart from the central tilted receivers at the same separation distances of the lower transmitters spaced apart from the central tilted receivers. Such a configuration provides a symmetric arrangement of sensors that can be grouped to provide a plurality of sub-arrays. Example separation distances can include separation distances of 16 inches, 32 inches, and 48 inches. Other separation distances can be used. In addition, there are separation distances that can be used that are not in a symmetric arrangement such as using the upper and lower transmitters with the remote titled receiver, R3, which can provide longer separation distances. In addition, tool 305 can be operated at a set of different frequencies. For example, tool 305 can be operated at frequencies including, but not limited to, 2 MHz, 500 KHz, and 125 KHz.

Figure 4A:
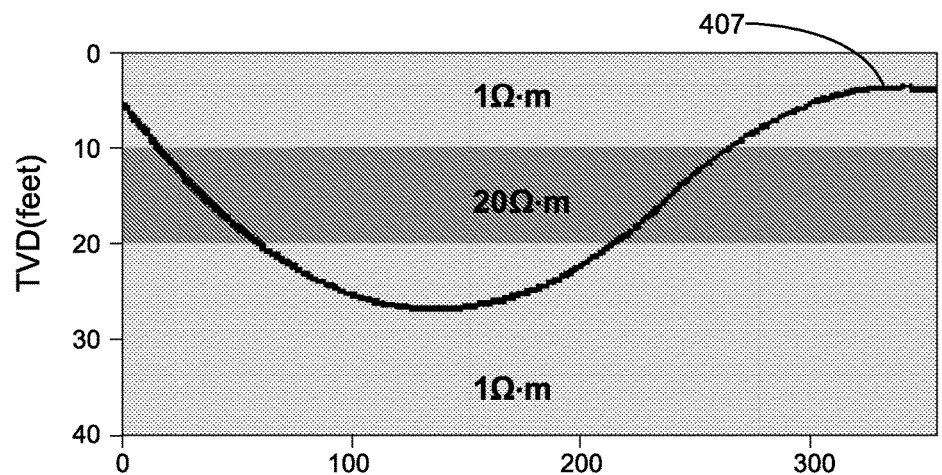
FIGS. 4A-4B show a three-layer formation with symmetric resistivity structures and geosignal phase responses of the tool configuration of FIG. 2 operating along a path in the three-layer formation, in accordance with various embodiments.
Figure 4B:
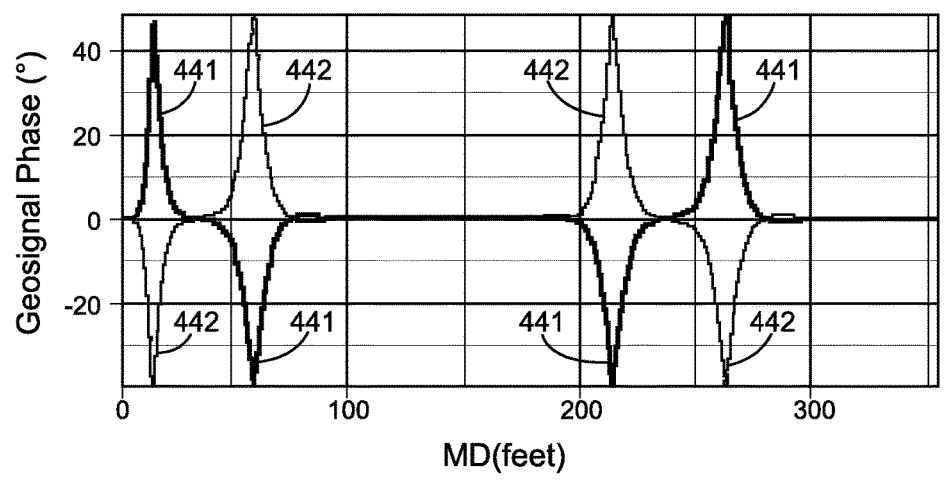

However, there are issues with using geosignal responses in several formation models, especially for a layered model with symmetric resistivity structures. Consider a three-layer formation model. FIG. 4A shows the tool of FIG. 3 drilled in a three-layer formation model along a path 407, where the upper and the lower layers have low resistivity of 1 Ω·m and the middle layer has high resistivity of 20 Ω·m. FIG. 4B displays the corresponding geosignal phase response 441 for the tool's high side direction and the corresponding geosignal phase response 442 for low side direction. High side direction (shown in FIG. 9) describes that the tool's face is pointing to the surface with azimuthal angle of 0°, whereas low side direction is 180° opposite to the high side direction. As illustrated in FIGS. 4A-4B, when the tool is located at true vertical direction (TVD) of 15 feet, the geosignal phase becomes null regardless of the drilling dip angle. Under this circumstance, petrophysicists may consider the formation geology as a homogeneous medium owing to tiny geosignal responses.

Figure 5A:
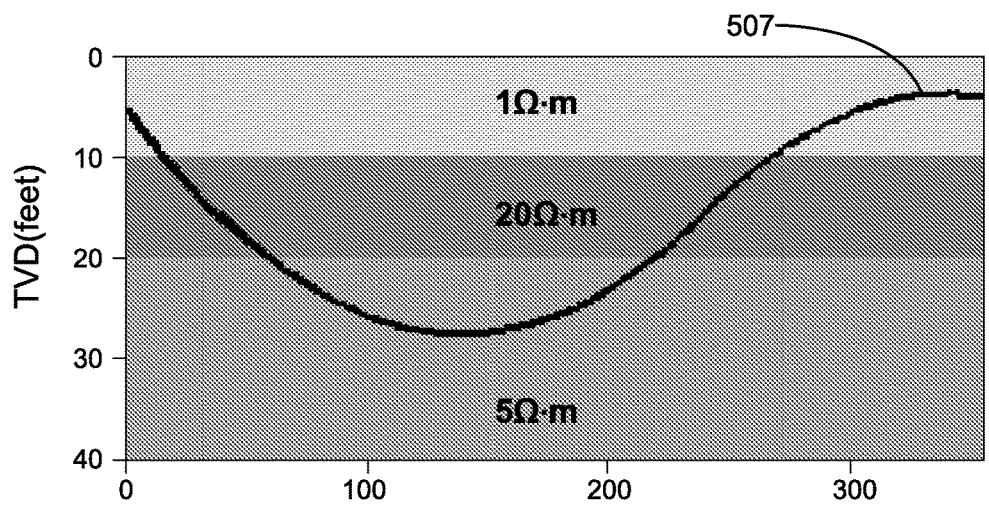
FIGS. 5A-5B show a three-layer formation without symmetric resistivity structures and geosignal phase responses of the tool configuration of FIG. 2 operating along a path in the three-layer formation, in accordance with various embodiments.
Figure 5B:
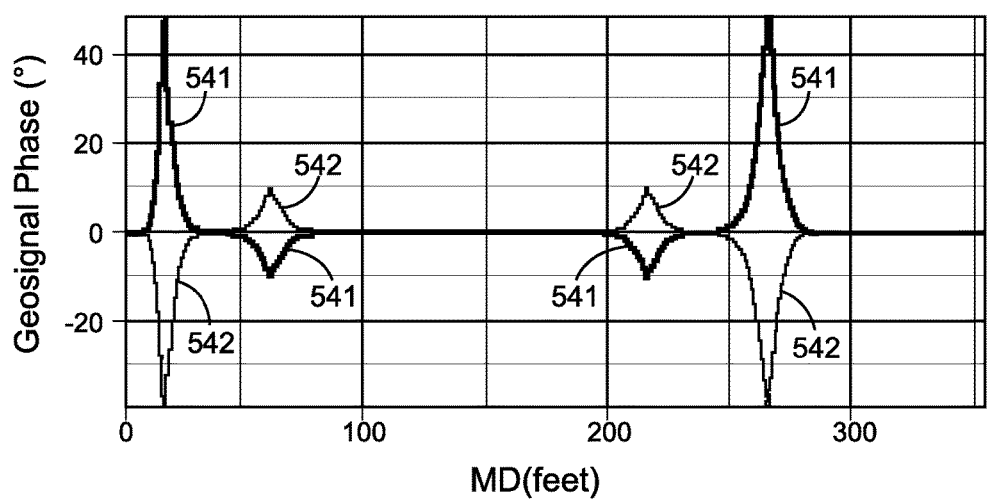

Similar situations occur if the lowest layer resistivity is changed to 5 Ω·m as shown in FIG. 5A, with the tool of FIG. 3 drilled in a three-layer formation model along a path 507. FIG. 5B displays the corresponding geosignal phase response 541 for the tool's high side direction and the corresponding geosignal phase response 542 for low side direction. At TVD around 12 feet in FIGS. 5A-5B, the corresponding geosignal phase remains null similar to the responses of a homogeneous formation case. As it can be seen from these figures for the tool of FIG. 3, regardless of what the resistivities are, there is a "blind-spot" where geosignal (or equivalently $V_x^z$) becomes zero in the three-layer scenario where middle layer is more resistive compared to the others. Other example formations, such as the middle layer being more conductive compared to the upper layer and the lower layer in a three-layer scenario, or multi-layer scenario, with resistivity profiles in high-low-high sequence or low-high-low sequence, could create such a "blind-spot" in geosignal responses of conventional LWD azimuthal directional resistivity EM tools.

Figures 6A, 6B, 6C:
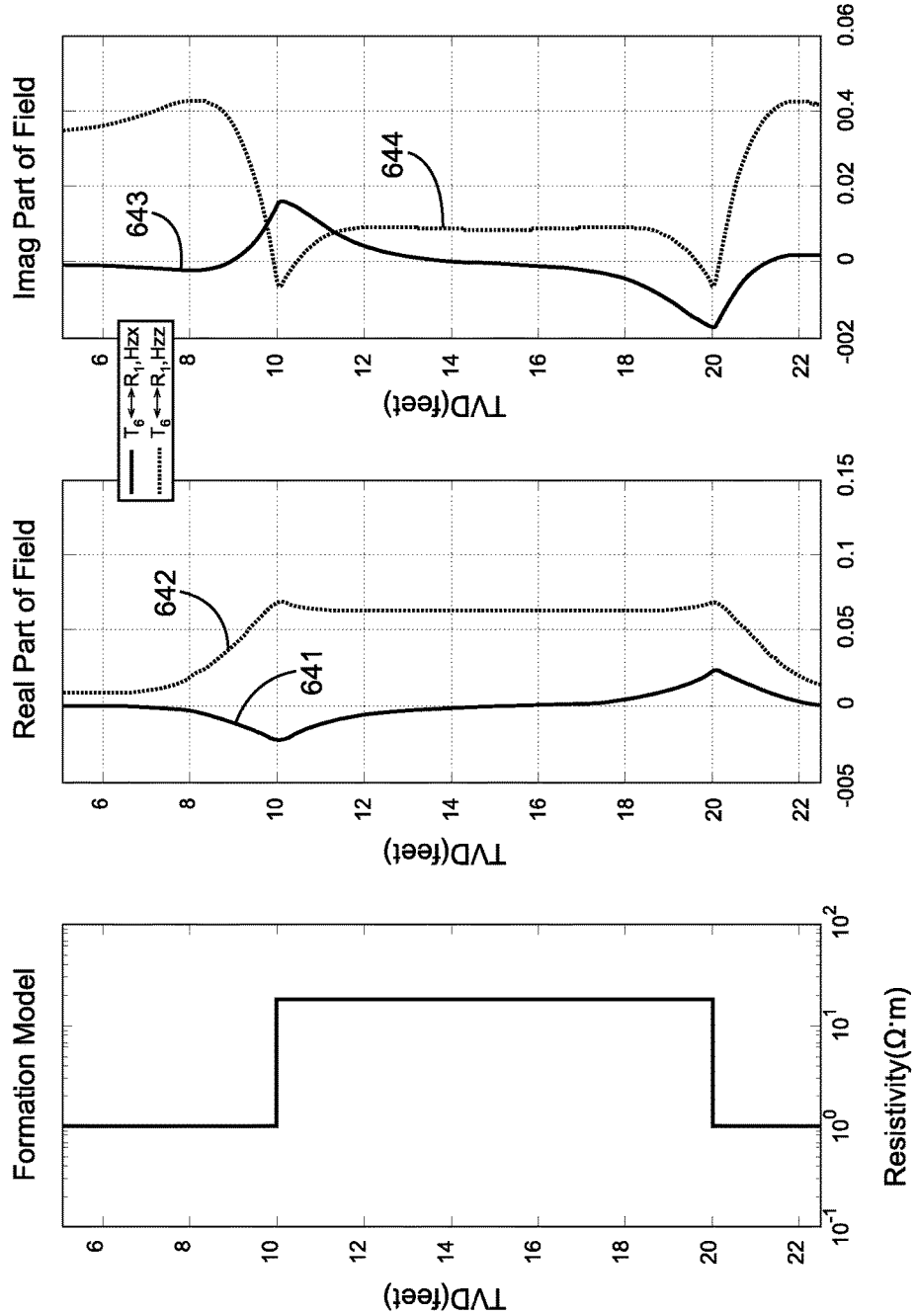
FIG. 6A-6C show magnetic field responses associated with transmitter T6 and receiver R1 in the tool configuration of FIG. 3 in the formation model in FIG. 3A, in accordance with various embodiments.

As mentioned above, geosignal responses of an azimuthal directional resistivity EM tool, currently in commercial use, are associated with coupling components of $V_z^z$ and $V_x^z$, and the azimuthal sensitivity is only related to $V_x^z$ coupling components (See International Publication WO 2011/129828). FIG. 6A shows a formation model, where FIG. 6B shows the real part of the magnetic field and FIG. 6C the imaginary part of the magnetic field using transmitter T6 and receiver R1 of FIG. 3. FIGS. 6B-C show the modeling responses of magnetic field related to ZX and ZZ coupling components. Curves 641 and 643 are for $H_{ZX}$ and curves 642 and 644 are for $H_{ZZ}$. The formation model is set the same as FIG. 4A, but has constant relative dip angle of 89°. As depicted in FIGS. 6B-6C, $H_{zx}$ coupling components become very small while tool is located in the middle of the formation model (TVD at 15 ft). Consequently, the azimuthal directional resistivity EM tool loses azimuthal sensitivity while encountering such formation models. Indeed, other kinds of symmetric layered formation models can make geosignal useless at certain depth location so that ambiguity issues are raised for conventional geosteering applications.

To resolve the ambiguities mentioned above in geosignal applications, new geosignal responses are introduced herein. As shown in FIGS. 6B-6C, the ZX coupling component loses sensitivity in the middle of the formation model (indeed, XZ coupling component will be similar as ZX), and ZZ coupling component cannot be utilized to provide azimuthal sensitivity. Therefore, two more coupling components are introduced to geosignal responses; that is, XX and YY coupling components.

Figure 7C:
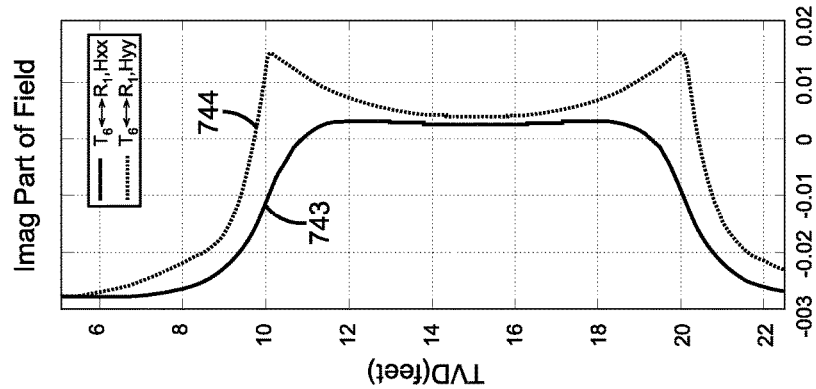
FIG. 7A-7C show magnetic field responses associated with XX and YY components in the formation model in FIG. 4A, in accordance with various embodiments.
Figure 7B:
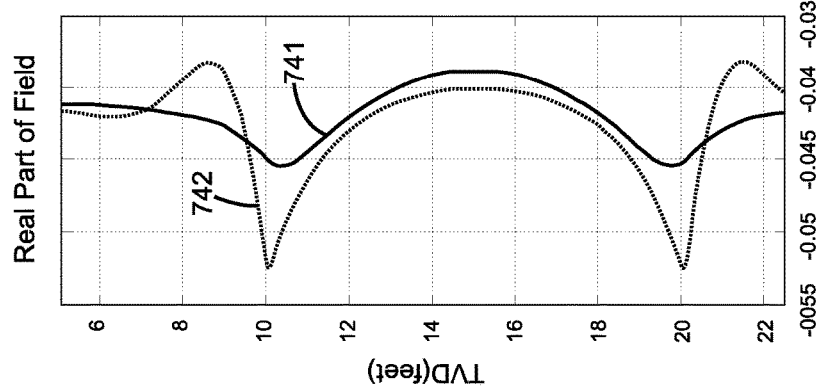
Figure 7A:
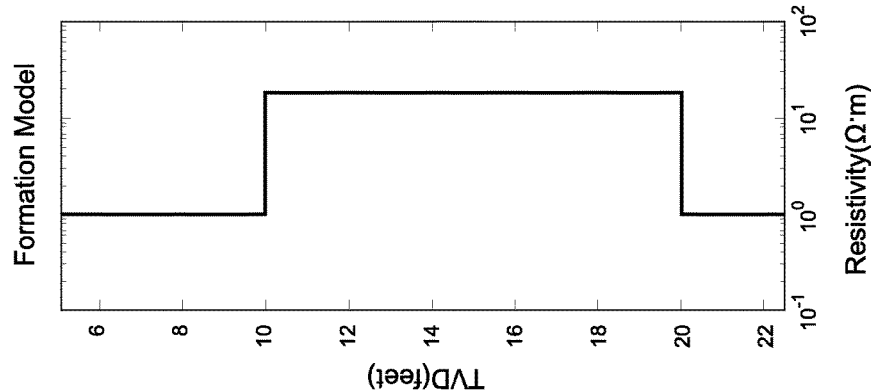

FIG. 7A shows the same formation model as FIG. 6A, and the same frequency and the antenna spacing (transmitter T6 and receiver R1 of FIG. 3) are used in FIGS. 7B-7C. FIGS. 7B-7C show the H field responses associated with XX and YY coupling components. Curves 741 and 743 are for $H_{XX}$ and curves 742 and 744 are for $H_{YY}$. In theory, coupling components of XX and YY are identical in a homogeneous formation model. As shown in FIGS. 7B-7C, there are always separations between XX and YY of the magnetic field, and thereby such separations can be utilized to address the ambiguities above. Increases in theses separations over distance can be used to identify boundaries between formation layers of different resistivities.

Figure 8:
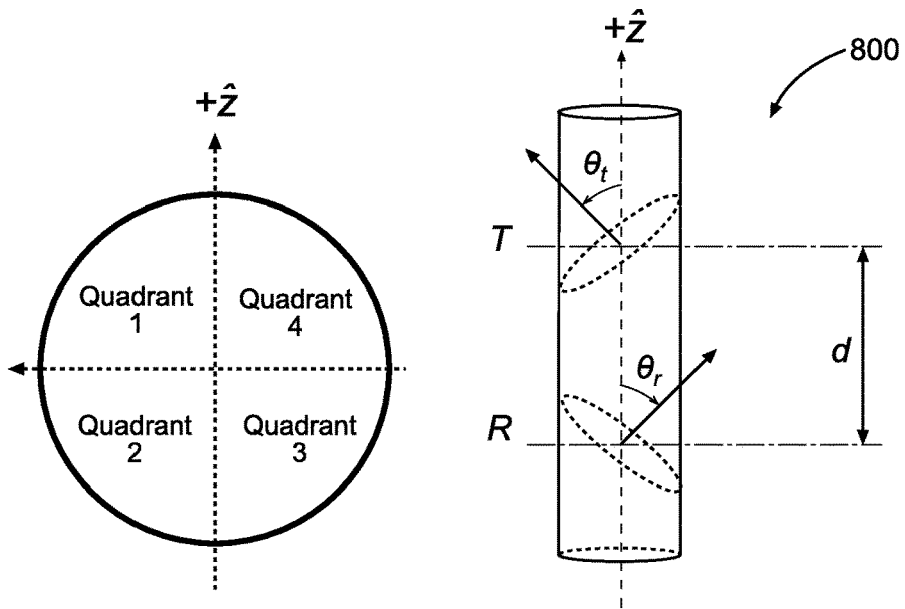
FIG. 8 shows a configuration of an antenna system equipped with a tilted receiver and a tilted transmitter, in accordance with various embodiments.
Figure 9:
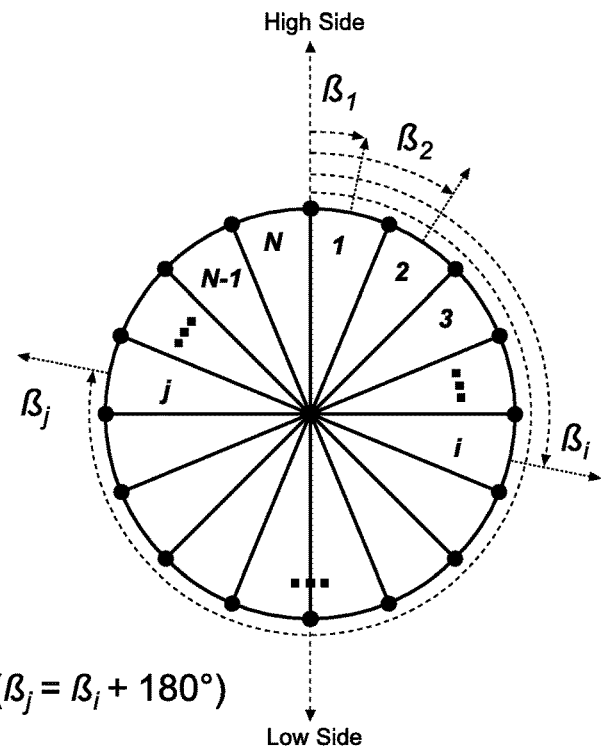
FIG. 9 shows a configuration of tool bin positions and corresponding azimuthal angles, in accordance with various embodiments.

The tilted transmitter and tilted receiver configuration 800 in FIG. 8 was discussed in International Publication WO2011/129828, where the configuration 800 can be operable to provide XX and YY components in LWD logging tools. In FIG. 8, the received signal at the receiver (R) with respect to the firing of the transmitter (T) can be expressed as equation (3).

$$V_R^T(\beta) = \left(\frac{C_{xx}}{2} - \frac{C_{yy}}{2}\right)\cos 2\beta + (C_{xz} + C_{zx})\cos\beta + \left(C_{zz} + \frac{C_{xx}}{2} + \frac{C_{yy}}{2}\right) \quad (3)$$

where $C_{xx} = V_x^x \sin\theta_t \sin\theta_r;\ C_{xy} = V_y^x \sin\theta_t \sin\theta_r;\ C_{xz} = V_z^x \sin\theta_t \cos\theta_r$ $C_{yx} = V_x^y \sin\theta_t \sin\theta_r;\ C_{yy} = V_y^y \sin\theta_t \sin\theta_r;\ C_{yz} = V_z^y \sin\theta_t \cos\theta_r$ $C_{zx} = V_x^z \sin\theta_t \sin\theta_r;\ C_{zy} = V_y^z \cos\theta_t \sin\theta_r;\ C_{zz} = V_z^z \cos\theta_t \cos\theta_r.$ In addition, two kinds of geosignal definitions ($V_{Geo1}$, and $V_{Geo2}$) were introduced in US Patent Publication 2008/0078580; the first kind of geosignal is defined by $$V_{Geo1}(i) \equiv \frac{V_R^T(\beta_i)}{\frac{1}{N}\sum_{i=1}^{N} V_R^T(\beta_i)}, i = 1, \ldots, N \quad (4)$$

and the other is expressed as $$V_{Geo2}(i) \equiv \frac{V_R^T(\beta_i)}{V_R^T(\beta_j)}, i = 1, \ldots, N \quad (5)$$

where i is the index of bin number of a rotating tool, $\beta_i$ is the corresponding azimuthal angle from high side to the bin with index i as shown in FIG. 9, $\beta_j$ is the azimuthal angle of bin j opposite to the azimuthal direction of bin i, and N is the total number of bins in FIG. 9.

Figure 10:
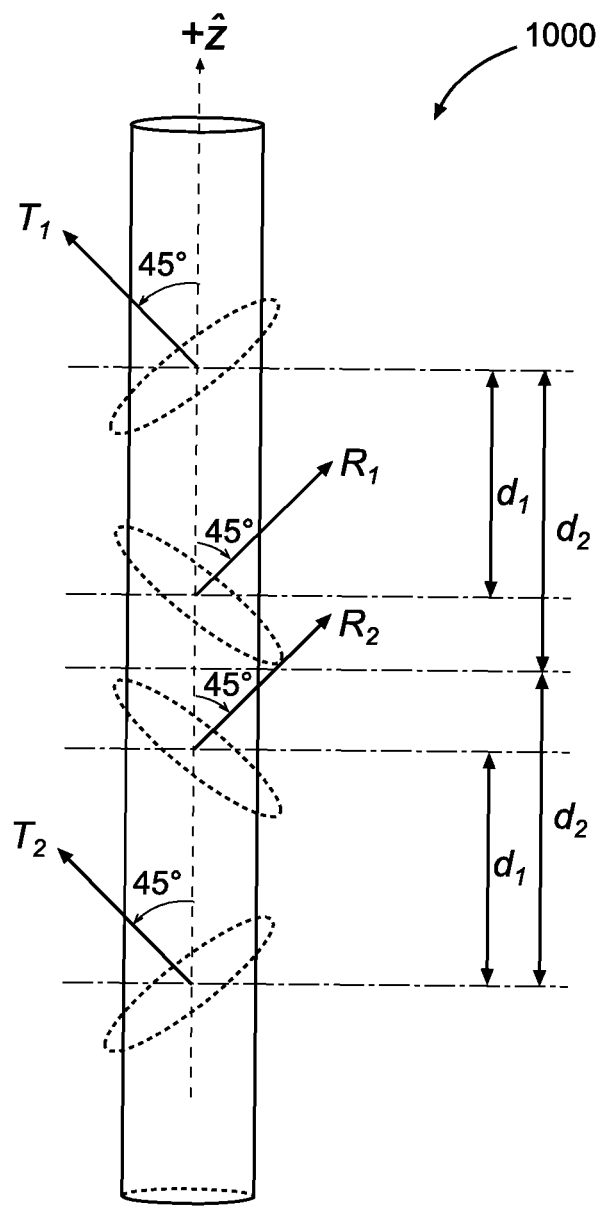
FIG. 10 shows a configuration of an electromagnetic tool equipped with both tilted transmitters and tilted receivers, in accordance with various embodiments.

Consider the antenna design 1000 in FIG. 10. With symmetric antenna structures, geosignal responses described in equations (4) and equation (5) can be compensated. Using the same drilling conditions as FIG. 6A, a first kind of geosignal, $V_{Geo1}$, of compensated geosignal phase response and attenuation response at four different tool azimuthal angles (0°, 90°, 180°, and 270°) are shown in FIG. 11A and FIG. 11B, respectively. Curve 1141 is for 0° azimuthal angle. Curve 1142 is for 90° azimuthal angle. Curve 1143 is for 180° azimuthal angle. Curve 1144 is for 270° azimuthal angle. Curve 1146 is for 0° azimuthal angle. Curve 1147 is for 90° azimuthal angle. Curve 1148 is for 180° azimuthal angle. Curve 1149 is for 270° azimuthal angle. Using the same drilling conditions as FIG. 6A, a second kind of geosignal, $V_{Geo2}$, of compensated geosignal phase response and attenuation response at four different tool azimuthal angles (0°, 90°, 180°, and 270°) are shown in FIG. 12A and FIG. 12B, respectively. Curve 1241 is for 0° azimuthal angle. Curve 1242 is for 90° azimuthal angle. Curve 1243 is for 180° azimuthal angle. Curve 1244 is for 270° azimuthal angle. Curve 1246 is for 0° azimuthal angle. Curve 1247 is for 90° azimuthal angle. Curve 1248 is for 180° azimuthal angle. Curve 1249 is for 270° azimuthal angle. As shown in FIGS. 11A-11B, the first kind of geosignal never goes null even if tool is located in the middle of the formation model. On the other hand, the second kind of geosignal responses are similar to the azimuthal directional resistivity EM tool, where ambiguities are found at such symmetric formation model.

Figure 14A:
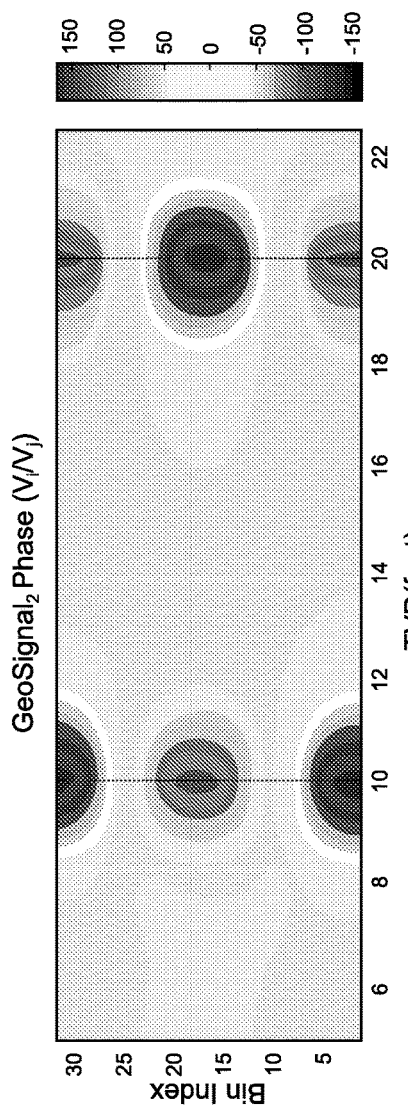
FIGS. 14A-14B show geosignal images of a second kind of the tool configuration in FIG. 10 in the formation model in FIG. 6A, in accordance with various embodiments.
Figure 14B:
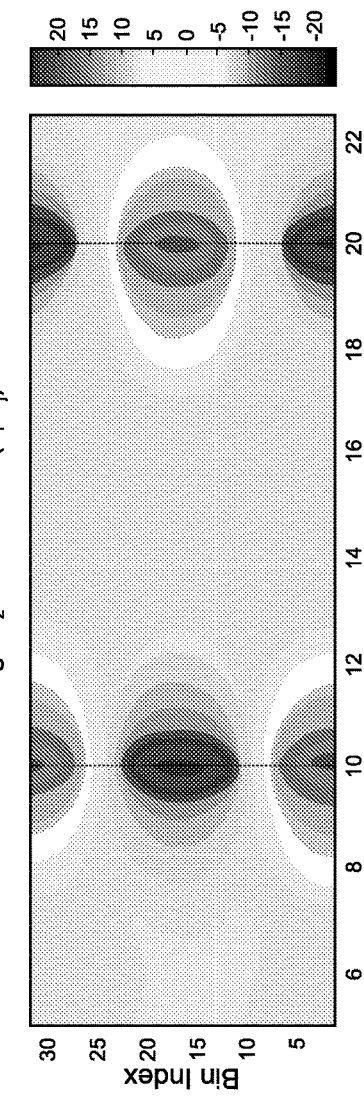

Consequently, combination of both kinds of geosignal responses may be utilized to distinguish between homogeneous formation model and inhomogeneous layered formation model with symmetric resistivity profiles. In fact, FIGS. 13A-13B show the geosignal phase image and the geosignal attenuation image of the first kind with respect to different tool azimuthal angles corresponding to the signals in FIG. 11A and FIG. 11B, respectively, in the formation model in FIG. 6A. FIGS. 14A-14B show the geosignal phase image and the geosignal attenuation image of the second kind with respect to different tool azimuthal angles corresponding to the signals in FIG. 12A and FIG. 12B, respectively, in the formation model in FIG. 6A. Using such geosignal images, petrophysicists can interpret formation geology without ambiguity issues.

When an EM tool located in the middle of a symmetrical layered formation or other formations), the difference of XX and YY components can remove the blind-spot. Therefore, utilization of such a difference between XX and YY components provides a mechanism to distinguish all described layered formation models from a homogeneous formation model. In the tool configuration in FIG. 10, the transmitters are perpendicular to the receivers and all antennas are tilted at 45 degrees. For such configuration, the voltage signal measured at a receiver in response to a transmitter's firing can be presented, as described in equation (3), as:

$$V_R^T(\beta) = -\frac{V_{xx} - V_{yy}}{4}\cos2\beta - \frac{V_{xz} - V_{zx}}{2}\cos\beta + \frac{2V_{zz} - V_{xx} - V_{yy}}{4} \quad (6)$$

So equation 4, using equation (6), can be represented as $$V_{Geo1}(i) \equiv \frac{V_R^T(\beta_i)}{\frac{1}{N}\sum_{i=1}^{N} V_R^T(\beta_i)} = \frac{-\frac{V_{xx} - V_{yy}}{4}\cos2\beta_i - \frac{V_{xz} - V_{zx}}{2}\cos\beta_i + \frac{2V_{zz} - V_{xx} - V_{yy}}{4}}{\frac{2V_{zz} - V_{xx} - V_{yy}}{4}}, \quad (7)$$

$$i = 1, \ldots, N$$

and equation (5), can be represented as $$V_{Geo2}(i) \equiv \frac{V_R^T(\beta_i)}{V_R^T(\beta_j)} = \frac{-\frac{V_{xx} - V_{yy}}{4}\cos2\beta_i - \frac{V_{xz} - V_{zx}}{2}\cos\beta_i + \frac{2V_{zz} - V_{xx} - V_{yy}}{4}}{-\frac{V_{xx} - V_{yy}}{4}\cos2(\beta_i + 180°) - \frac{V_{xz} - V_{zx}}{2}\cos(\beta_i + 180°) + \frac{2V_{zz} - V_{xx} - V_{yy}}{4}} = \frac{-\frac{V_{xx} - V_{yy}}{4}\cos2\beta_i - \frac{V_{xz} - V_{zx}}{2}\cos\beta_i + \frac{2V_{zz} - V_{xx} - V_{yy}}{4}}{-\frac{V_{xx} - V_{yy}}{4}\cos2\beta_i - \frac{V_{xz} - V_{zx}}{2}\cos\beta_i + \frac{2V_{zz} - V_{xx} - V_{yy}}{4}}, \quad (8)$$

$$i = 1, \ldots, N$$

As indicated in equations (7) and (8), for different azimuthal angle $\beta_i$ at different bin i, $V_{Geo1}$ includes both variations between XX and YY and between XZ and ZX, which is capable to determine the ambiguity associated with the blind spot using conventional techniques. However, the $V_{Geo2}$ geosignal only observes the variations of XZ and ZX, which is similar to conventional commercial directional azimuthal EM tools that utilize ZX components.

On the other hand, for the tool configuration in FIG. 10, a processing unit can decouple $$-\frac{V_{xx} - V_{yy}}{4}\cos2\beta, -\frac{V_{xz} - V_{zx}}{2}\cos\beta, \text{ and } + \frac{2V_{zz} - V_{xx} - V_{yy}}{4}$$

by applying a fitting function and/or Fourier transform to equation (3). Then, a geosignal response of a third kind can be calculated and generated as $$V_{Geo3}(i) \equiv \frac{-\frac{V_{xx} - V_{yy}}{4}\cos2\beta}{\frac{2V_{zz} - V_{xx} - V_{yy}}{4}}, \quad (9)$$

and a geosignal response of a fourth kind $$V_{Geo4}(i) \equiv \frac{-\frac{V_{xz} - V_{zx}}{4}\cos\beta}{\frac{2V_{zz} - V_{xx} - V_{yy}}{4}} \quad (10)$$

Geosignal $V_{Geo3}$ can be used to solve the ambiguity issue, and geosignal $V_{Geo4}$ generated is similar to geosignal responses of conventional commercial tools. New geosignals can be generated to reflect the differences in XX and YY components to remove blind spot ambiguities.

Figure 15D:
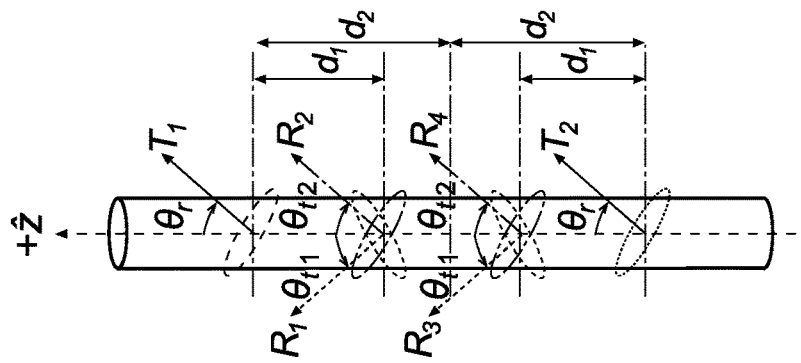
FIGS. 15A-15D show antenna configurations operable to acquire compensated geosignal responses, in accordance with various embodiments.
Figure 15C:
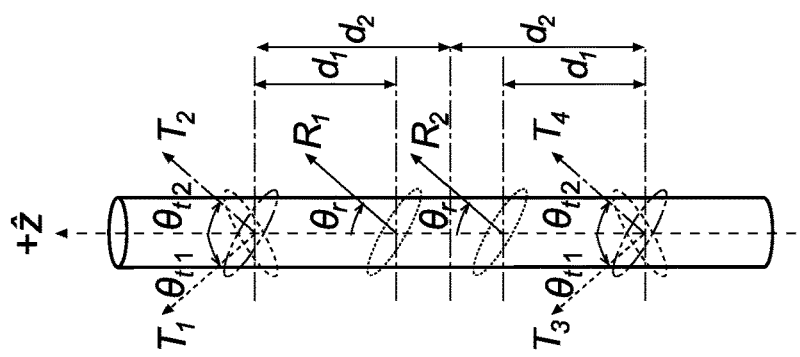
Figure 15B:
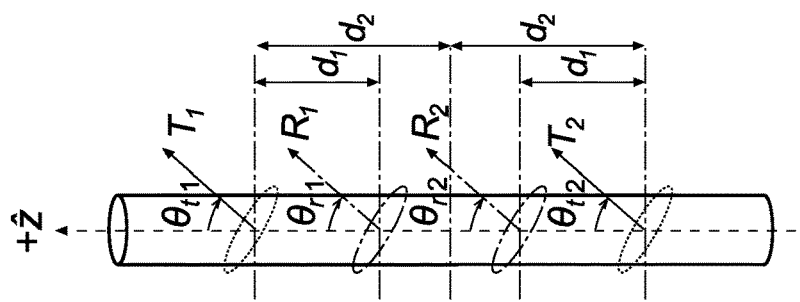
Figure 15A:
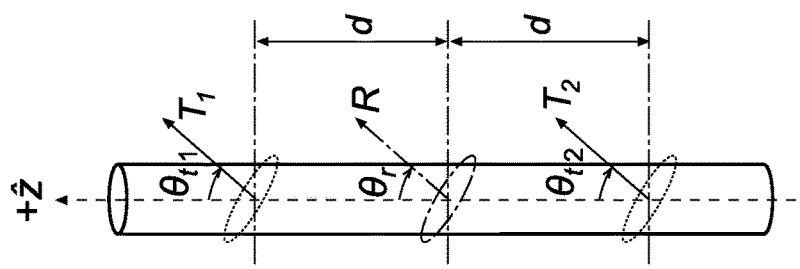

In addition to using the value of the difference between XX and YY coupling components, other geosignal responses can be also defined by, but not limited by, the value of the ratio between XX and YY coupling components or the value of the square root of XX and YY coupling components. Other algebraic functions of XX and YY can also be used. Such values can be calculated on the basis of magnetic field and/or complex voltage signals. The use of the square root can be obtained by multi-component tools with configuration of FIG. 2, for example. By acquiring all coupling components, one can generate and simulate geosignal responses using combinations of coupling components that include XX and YY coupling components to differentiate between null signals of associated with conventional tools in a "blind-spot" and in homogeneous medium. For example, the tool configurations of FIGS. 15C and 15D can be used to decouple all coupling components. Asymmetrical tool configurations can be utilized along with a depth shift technique to achieve such decoupling. With the decoupled components, different geosignal responses can be generated as functions of combinations of coupling components related to, but not limited to, (XX−YY)/(XX+YY+2ZZ), (XX−YY)/(XX+YY−2ZZ), XX/ZZ and YY/ZZ, (XX−YY)/ZZ and (XX+YY)/ZZ, XX/(XX+YY+2ZZ) and YY/(XX+YY+2ZZ), or XX/(XX+YY−2ZZ) and YY/(XX+YY−2ZZ) that have capabilities to solve the ambiguity issue. By examining and using XX and YY coupling components, the ambiguity issues of conventional geosteering applications can be resolved.

Embodiments of the geosignal responses above may be obtained by different configurations with both transmitter(s) and receiver(s) tilted. In addition, one can use at least one tilt transmitter and at least one tilt receiver to achieve the geosignal responses taught herein. Several possible configurations are also shown in FIGS. 15A-15D to enable compensated signals, where compensation can be achieved between same bin data or opposite bin data associated with the upper and the lower azimuthal measurements. For example, the upper means data from $T_1$-R and the lower means data from $T_2$-R in the configuration of FIG. 15A. Owing to antenna reciprocity, a transmitter and a receiver can be exchangeable in FIGS. 15A-15D.

Figure 16:
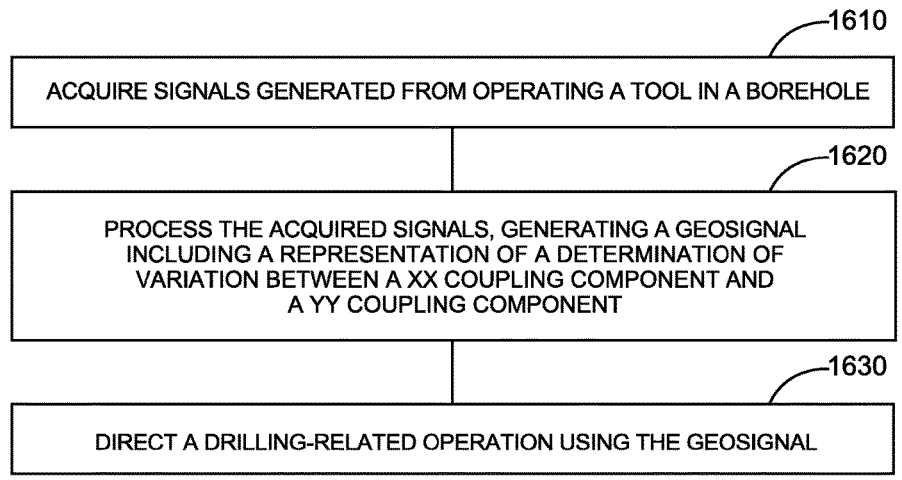
FIG. 16 shows features of an example method of conducting a drilling-related activity with respect to a geosignal, in accordance with various embodiments.

FIG. 16 shows features of an embodiment of an example method of conducting a drilling-related activity with respect to a geosignal. At 1610, signals are acquired where the signals are or have been generated from operating a tool in a borehole. The tool, having a longitudinal axis, can include one or more transmitting sensors tilted with respect to the longitudinal axis and one or more receiving sensors tilted with respect to the longitudinal axis. The acquired signals can include signals received at the one or more tilted receiving sensors in response to firing the one or more tilted transmitting sensors. Firing of transmitting sensors can include controlling the firing such that the transmitting sensors are conducted separately. Acquiring the signals can include collecting a signal at each receiving sensor separately with respect to separately fired transmitting sensors. Acquiring signals can include acquiring compensated signals. Acquiring signals can include acquiring voltage signals generated from operating the tool having a symmetric arrangement of the one or more tilted transmitting sensors and the one or more tilted receiving sensors. Acquiring signals can include acquiring voltage signals generated from operating the tool to selectively activate selected transmitting sensors of the one or more tilted transmitting sensors and to selectively collect the signals from selected tilted receiving sensors of the one or more tilted receiving sensors such that the selected transmitting sensors and the selected tilted receiving sensors are in a symmetric arrangement with respect to the longitudinal axis. The one or more transmitting sensors and the one or more receiving sensors can be, but are not limited to, antennas tilted with tilt angle having a magnitude of 45° with respect to the longitudinal axis or within one or two degrees of 45° such that the magnitude can be approximately 45° with respect to the longitudinal axis. Acquiring signals can include acquiring voltage signals with respect to tool orientation, the tool orientation including a number of directions, the total number of directions corresponding to one complete rotation partitioned into N bins, each bin associated with an angle of rotation equal to $2\pi/N$, N being an integer equal to or greater than one. Acquiring signals can include acquiring voltage signals generated from operating the tool rotating in the borehole. Acquiring signals generated from operating the tool can include using a tool having an arrangement of one or more transmitting sensors tilted substantially with respect to a longitudinal axis of the tool and one or more receiving sensors tilted substantially with respect to the longitudinal axis such that the acquired signals provide decoupled coupling components.

At 1620, the acquired signals are processed in a processing unit, generating a geosignal including a representation of a determination of variation between a XX coupling component and a YY coupling component. The variation the XX coupling component and the YY coupling component may be used to resolve ambiguities associated with conventional tools in layered formations. Processing the acquired signals can include decoupling coupling components from the acquired signals and using the decoupled coupling components to generate the geosignal. Generating the geosignal can include basing the geosignal on a difference between XX and YY coupling component, a ratio between XX and YY coupling component, or a square root of XX and YY coupling components. Generating the geosignal can include basing the geosignal on a combination of coupling components according to relationships of coupling components including (XX−YY)/(XX+YY+2ZZ), (XX−YY)/(XX+YY−2ZZ), XX/ZZ and YY/ZZ, (XX−YY)/ZZ and (XX+YY)/ZZ, XX/(XX+YY+2ZZ) and YY/(XX+YY+2ZZ), or XX/(XX+YY−2ZZ) and YY/(XX+YY−2ZZ). A geosignal can be generated from acquired compensated signals. Generating a geosignal from the acquired signals includes generating a geosignal phase and a geosignal attenuation. Processing the acquired signals can include calculating coupling components for a coupling matrix using the acquired signals, and performing one or more inversion operations to generate formation parameters from the coupling matrix.

At 1630, a drilling-related operation is directed using the geosignal. The drilling-related operation can include geo steering a drilling operation based on the geosignal. The drilling-related operation can include performing analysis of the formation structure using generated geosignals.

In various embodiments, a machine-readable storage device can comprise instructions stored thereon, which, when performed by a machine, cause the machine to perform operations, the operations comprising one or more features similar to or identical to features of methods or techniques described herein. In various embodiments, a system can comprise a tool having a longitudinal axis, the tool including one or more transmitting sensors tilted with respect to the longitudinal axis and one or more receiving sensors tilted with respect to the longitudinal axis; and a processing unit to generate a geosignal based on a XX coupling component, a YY coupling component, or a combination of XX coupling component and YY coupling component, wherein the tool and the processing unit are configured to operate according to one or more features similar to or identical to features of methods or techniques described herein.

Currently, commercial geosteering tool services may not be able to make any useful measurement when they are close to the center of a reservoir. For instance, in a geo steering application using a conventional azimuthal directional EM tool, the tool becomes blind to adjacent boundaries when it is located near the center of the layer. Therefore, directional guidance on the basis of such a tool becomes useless under this circumstance. Herein, embodiments of geosignal methodologies can resolve this and similar ambiguity issues. Such geosignal responses when used along with known geosignal responses can assist petrophysicists to acquire more accurate formation geology and more reliably steer the tool in real-time. Increased geo steering reliability may be made attained using embodiments of geosignal responses, similar to or identical to geosignal responses taught herein, only are available when both transmitter and receiver are tilted.

Figure 17:
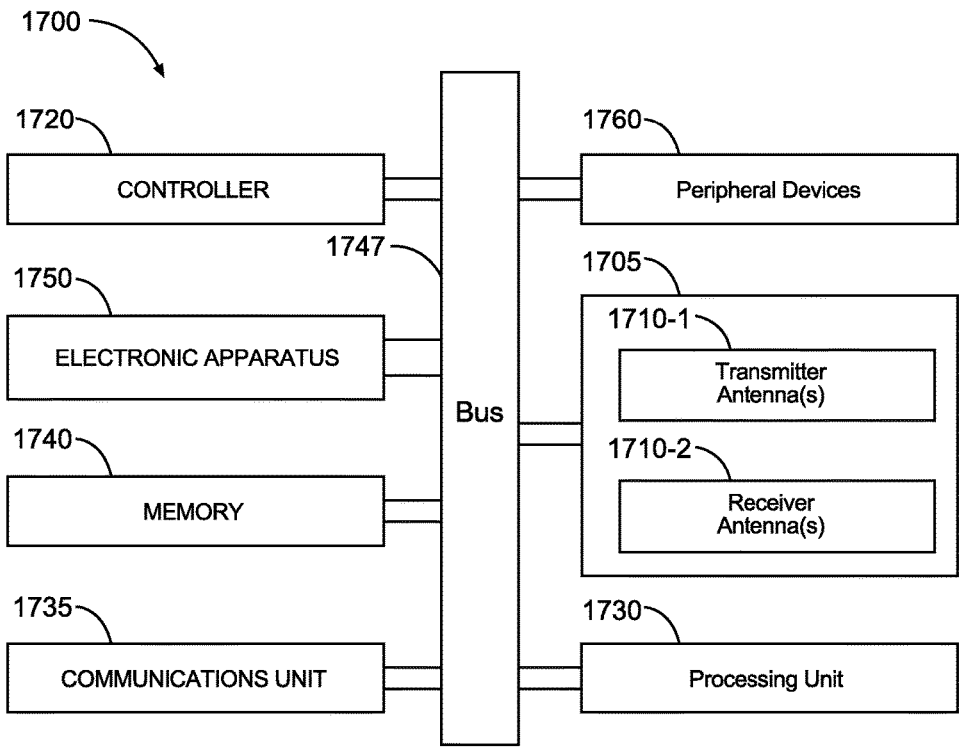
FIG. 17 depicts a block diagram of features of an example system operable to make measurements in a borehole and process measured signals to conduct a drilling-related activity with respect to a geosignal, in accordance with various embodiments.

FIG. 17 depicts a block diagram of features of an example system 1700 operable to conduct a drilling-related activity with respect to a geosignal. The system 1700 includes a tool 1705 having an arrangement of transmitter antenna(s) 1710-1 and receiver antenna(s) 1710-2 operable in a borehole. The arrangements of the transmitter antenna(s) 1710-1 and the receiver antenna(s) 1710-2 of the tool 1705 can be realized similar to or identical to arrangements discussed herein. The system 1700 can also include a controller 1720, a memory 1740, an electronic apparatus 1750, and a communications unit 1735. The controller 1720 and the memory 1740 can be arranged to operate the tool 1705 to acquire measurement data as the tool 1705 is operated and to assign the acquired data to a number of bins, each correlated to an azimuthal angle in a rotation of the tool 1705. The controller 1720 and the memory 1740 can be realized to control activation of selected ones of the transmitter antennas 1710-1 and data acquisition by selected one of the receiver antennas 1710-2 in the tool 1705 and to manage processing schemes to determine a geosignal in accordance with measurement procedures and signal processing as described herein. Processing unit 1720 can be structured to perform the operations to manage processing schemes to determine a geosignal in accordance with measurement procedures and signal processing in a manner similar to or identical to embodiments described herein.

Electronic apparatus 1750 can be used in conjunction with the controller 1720 to perform tasks associated with taking measurements downhole with the transmitter antenna(s) 1710-1 and the receiver antenna(s) 1710-2 of the tool 1705. The communications unit 1735 can include downhole communications in a drilling operation. Such downhole communications can include a telemetry system.

The system 1700 can also include a bus 1747, where the bus 1747 provides electrical conductivity among the components of the system 1700. The bus 1747 can include an address bus, a data bus, and a control bus, each independently configured. The bus 1747 can also use common conductive lines for providing one or more of address, data, or control, the use of which can be regulated by the controller 1720. The bus 1747 can be configured such that the components of the system 1700 are distributed. Such distribution can be arranged between downhole components such as the transmitter antenna(s) 1710-1 and the receiver antenna(s) 1710-2 of the tool 1705 and components that can be disposed on the surface of a well. Alternatively, the components can be co-located such as on one or more collars of a drill string or on a wireline structure.

In various embodiments, peripheral devices 1760 can include displays, additional storage memory, and/or other control devices that may operate in conjunction with the controller 1720 and/or the memory 1740. In an embodiment, the controller 1720 can be realized as one or more processors. The peripheral devices 1760 can be arranged with a display with instructions stored in the memory 1740 to implement a user interface to manage the operation of the tool 1705 and/or components distributed within the system 1700. Such a user interface can be operated in conjunction with the communications unit 1735 and the bus 1747. Various components of the system 1700 can be integrated with the tool 1705 such that processing identical to or similar to the processing schemes discussed with respect to various embodiments herein can be performed downhole in the vicinity of the measurement or at the surface.

Figure 18:
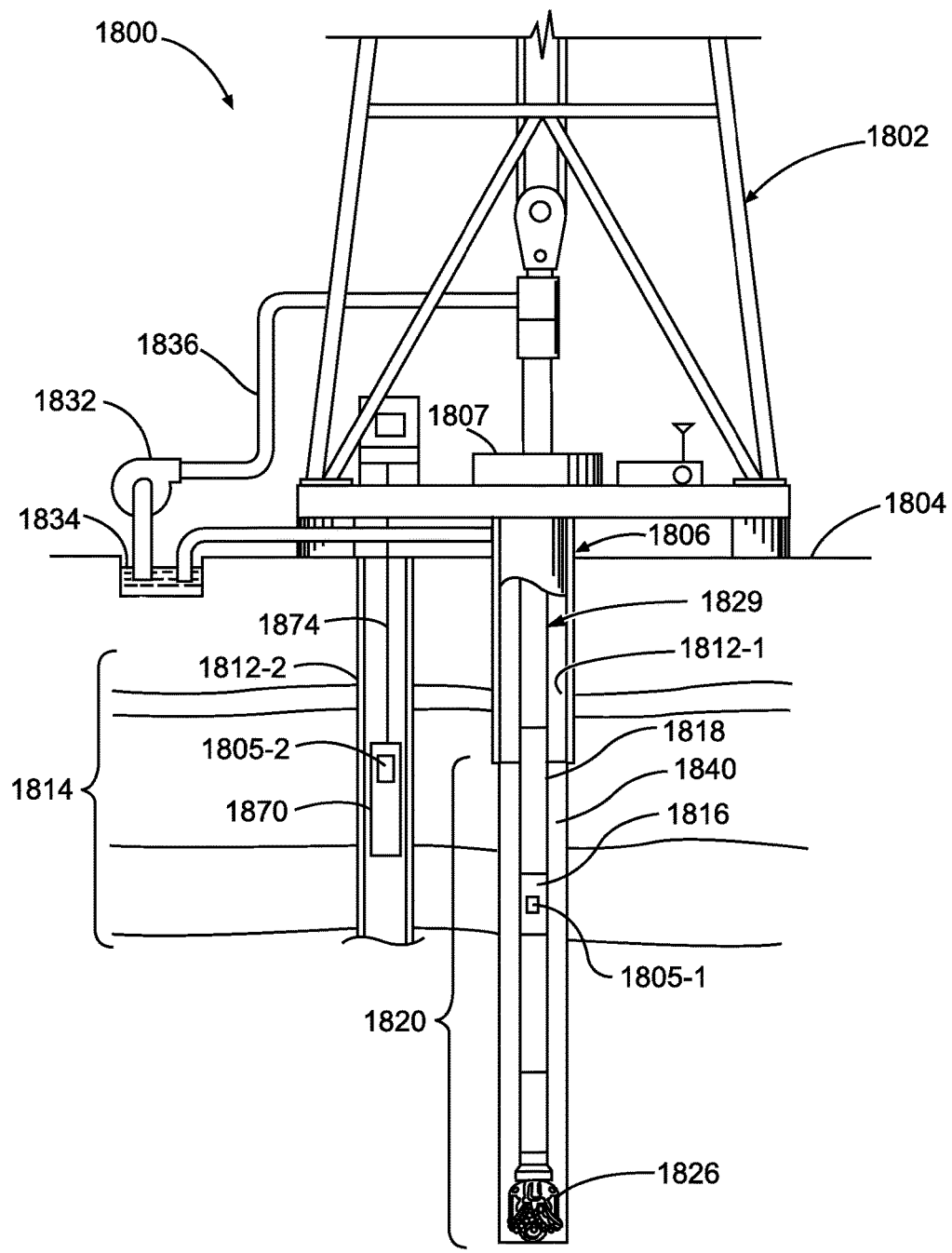
FIG. 18 depicts an embodiment of a system at a drilling site, where the system includes a measurement tool and processing unit operable to conduct a drilling-related activity with respect to a geosignal, in accordance with various embodiments.

FIG. 18 depicts an embodiment of a system 1800 at a drilling site, where the system 1800 includes an apparatus operable to conduct a drilling-related activity with respect to a geosignal. The system 1800 can include a tool 1805-1, 1805-2, or both 1805-1 and 1805-2 having an arrangement of transmitter antennas and receiver antennas operable to make measurements that can be used for a number of drilling tasks including, but not limited to, determining geosignals. The tools 1805-1 and 1805-2 can be structured identical to or similar to a tool architecture or combinations of tool architectures discussed herein, including control units and processing units operable to perform processing schemes in a manner identical to or similar to processing techniques to determine geosignals discussed herein. The tools 1805-1, 1805-2, or both 1805-1 and 1805-2 can be distributed among the components of system 1800. The tools 1805-1 and 1805-2 can be realized in a similar or identical manner to arrangements of control units, transmitters, receivers, and processing units discussed herein. The tools 1805-1 and 1805-2 can be structured, fabricated, and calibrated in accordance with various embodiments as taught herein.

The system 1800 can include a drilling rig 1802 located at a surface 1804 of a well 1806 and a string of drill pipes, that is, drill string 1829, connected together so as to form a drilling string that is lowered through a rotary table 1807 into a wellbore or borehole 1812-1. The drilling rig 1802 can provide support for the drill string 1829. The drill string 1829 can operate to penetrate rotary table 1807 for drilling the borehole 1812-1 through subsurface formations 1814. The drill string 1829 can include a drill pipe 1818 and a bottom hole assembly 1820 located at the lower portion of the drill pipe 1818.

The bottom hole assembly 1820 can include a drill collar 1816 and a drill bit 1826. The drill bit 1826 can operate to create the borehole 1812-1 by penetrating the surface 1804 and the subsurface formations 1814. The bottom hole assembly 1820 can include the tool 1805-1 attached to the drill collar 1816 to conduct measurements to determine formation parameters. The tool 1805-1 can be structured for an implementation as a MWD system such as a LWD system. The housing containing the tool 1805-1 can include electronics to initiate measurements from selected transmitter antennas and to collect measurement signals from selected receiver antennas. Such electronics can include a processing unit to provide analysis of formation parameters and geosignals over a standard communication mechanism for operating in a well. Alternatively, electronics can include a communications interface to provide measurement signals collected by the tool 1805-1 to the surface over a standard communication mechanism for operating in a well, where these measurements signals can be analyzed at a processing unit at the surface to provide analysis of formation parameters and to determine geosignals.

During drilling operations, the drill string 1829 can be rotated by the rotary table 1807. In addition to, or alternatively, the bottom hole assembly 1820 can also be rotated by a motor (e.g., a mud motor) that is located downhole. The drill collars 1816 can be used to add weight to the drill bit 1826. The drill collars 1816 also can stiffen the bottom hole assembly 1820 to allow the bottom hole assembly 1820 to transfer the added weight to the drill bit 1826, and in turn, assist the drill bit 1826 in penetrating the surface 1804 and the subsurface formations 1814.

During drilling operations, a mud pump 1832 can pump drilling fluid (sometimes known by those of skill in the art as "drilling mud") from a mud pit 1834 through a hose 1836 into the drill pipe 1818 and down to the drill bit 1826. The drilling fluid can flow out from the drill bit 1826 and be returned to the surface 1804 through an annular area 1840 between the drill pipe 1818 and the sides of the borehole 1812-1. The drilling fluid may then be returned to the mud pit 1834, where such fluid is filtered. In some embodiments, the drilling fluid can be used to cool the drill bit 1826, as well as to provide lubrication for the drill bit 1826 during drilling operations. Additionally, the drilling fluid may be used to remove subsurface formation cuttings created by operating the drill bit 1826.

In various embodiments, the tool 1805-2 may be included in a tool body 1870 coupled to a logging cable 1874 such as, for example, for wireline applications. The tool body 1870 containing the tool 1805-2 can include electronics to initiate measurements from selected transmitter antennas and to collect measurement signals from selected receiver antennas. Such electronics can include a processing unit to provide analysis of formation parameters and geosignals over a standard communication mechanism for operating in a well. Alternatively, electronics can include a communications interface to provide measurement signals collected by the tool 1805-2 to the surface over a standard communication mechanism for operating in a well, where these measurements signals can be analyzed at a processing unit at the surface to provide analysis of formation parameters, including an estimate of the true formation resistivity for each formation layer investigated. The logging cable 1874 may be realized as a wireline (multiple power and communication lines), a mono-cable (a single conductor), and/or a slick-line (no conductors for power or communications), or other appropriate structure for use in the borehole 1812. Though FIG. 18 depicts both an arrangement for wireline applications and an arrangement for LWD applications, the system 1800 may be also realized for one of the two applications.

In various embodiments, a measurement tool and processing unit can be arranged to determine and generate XX and YY coupling components that include sensitivity of both XX and YY coupling components to differentiate between null signals associated with conventional tools in a "blind-spot" and in homogeneous medium. The sensitivity of XX and YY coupling components may be provided by processing to decouple coupling components of a coupling matrix, by arrangement of transmitting sensors and receiving sensors that that directly provides decoupled XX and YY coupling components, and by arrangement of transmitting sensors and receiving sensors that that provides decoupled XX and YY coupling components with limited processing. Different geosignals can be generated according to different combinations of coupling components that utilize XX and YY sensitivity to resolve "blind-spot" issues.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
acquiring compensated signals from a tool disposed in a borehole, wherein the tool comprises one or more receiving sensors and one or more transmitting sensors configured in a mutually symmetric manner with respect to a longitudinal axis of the tool along which the receiving sensors and the transmitting sensors are disposed;
obtaining a variation between XX and YY coupling components from the acquired compensated signals, wherein obtaining the variation between the XX and YY coupling components from the acquired compensated signals includes decoupling the XX and the YY coupling components from the acquired signals and using the decoupled XX and YY coupling components to determine the variation;
generating a geosignal based, at least in part, on the variation between the XX and YY coupling components; and
directing a drilling-related operation using the geosignal.

2. The method of claim 1, wherein the one or more transmitting sensors and the one or more receiving sensors are tilted with respect to the longitudinal axis of the tool such that the acquired compensated signals provide decoupled coupling components.

3. The method of claim 1, wherein the variation between the XX and YY coupling components comprises at least one of a difference between the XX and YY coupling components, a ratio between the XX and YY coupling components, or a square root of the XX and YY coupling components.

4. The method of claim 1, wherein generating the geosignal includes basing the geosignal on a combination of coupling components related to (XX−YY)/(XX+YY+2ZZ), (XX−YY)/(XX+YY−2ZZ), XX/ZZ and YY/ZZ, (XX−YY)/ZZ and (XX+YY)/ZZ, XX/(XX+YY+2ZZ) and YY/(XX+YY+2ZZ), or XX/(XX+YY−2ZZ) and YY/(XX+YY−2ZZ).

5. The method of claim 1, wherein acquiring signals includes acquiring compensated signals, and wherein the geosignal is generated from the compensated signals.

6. The method of claim 1, wherein the acquired compensated signals include signals received at the one or more receiving sensors in response to generating a transmission signal from each of the one or more transmitting sensors.

7. The method of claim 1, wherein acquiring compensated signals includes acquiring voltage signals generated based on selectively activating selected transmitting sensors of the one or more transmitting sensors and selectively collecting the signals from selected receiving sensors of the one or more receiving sensors.

8. The method of claim 1, wherein the one or more transmitting sensors and the one or more receiving sensors are antennas tilted with tilt angle having a magnitude of 45° or within one or two degrees of 45° with respect to the longitudinal axis of the tool.

9. The method of claim 1, further comprising:
calculating coupling components for a coupling matrix using the acquired compensated signals; and
performing one or more inversion operations to generate formation parameters from the coupling matrix.

10. The method of claim 1, wherein acquiring compensated signals includes acquiring voltage signals with respect to tool orientation, the tool orientation including a number of directions, the number of directions corresponding to one complete rotation partitioned into N bins, each bin associated with an angle of rotation equal to $2\pi/N$, N being an integer equal to or greater than one.

11. The method of claim 1, wherein acquiring compensated signals includes acquiring voltage signals generated from operating the tool rotating in the borehole.

12. The method of claim 1, wherein the method includes geosteering a drilling operation based on the geosignal.

13. The method of claim 1, wherein generating the geosignal includes generating a geosignal phase and a geosignal attenuation.

14. A system comprising:
a tool having one or more transmitting sensors and one or more receiving sensors configured in a mutually symmetric manner with respect to a longitudinal axis of the tool along which the receiving sensors and the transmitting sensors are disposed; and a processing unit; and a machine-readable storage device having instructions executable by the processing unit to cause the system to:

acquire compensated signals from the tool disposed in a borehole;

obtain a variation between XX and YY coupling components from the acquired compensated signals, wherein obtaining the variation between the XX and YY coupling components from the acquired compensated signals includes decoupling the XX and the YY coupling components from the acquired signals and using the decoupled XX and YY coupling components to determine the variation;

generate a geosignal based, at least in part, on the variation between the XX and YY coupling components; and direct a drilling-related operation using the geosignal.

15. The system of claim 14, wherein the one or more transmitting sensors and the one or more receiving sensors include an arrangement of one or more transmitting sensors tilted substantially with respect to the longitudinal axis of the tool and one or more receiving sensors tilted substantially with respect to the longitudinal axis such that the acquired compensated signals provide decoupled coupling components.

16. The system of claim 14, wherein the variation between the XX and YY coupling components comprises at least one of a difference between XX and YY coupling component, a ratio between XX and YY coupling component, or a square root of XX and YY coupling components.

17. The system of claim 14, wherein the instructions to generate the geosignal include basing the geosignal on a combination of coupling components related to (XX−YY)/(XX+YY+2ZZ), (XX−YY)/(XX+YY−2ZZ), XX/ZZ and YY/ZZ, (XX−YY)/ZZ and (XX+YY)/ZZ, XX/(XX+YY+2ZZ) and YY/(XX+YY+2ZZ), or XX/(XX+YY−2ZZ) and YY/(XX+YY−2ZZ).

18. The system of claim 14, wherein the one or more transmitting sensors and the one or more receiving sensors include an arrangement of one or more transmitting sensors tilted substantially with respect to the longitudinal axis of the tool and one or more receiving sensors tilted substantially with respect to the longitudinal axis such that acquired compensated signals including signals received at the one or more tilted receiving sensors in response to generating a transmission signal from each of the one or more tilted transmitting sensors.

19. The system of claim 14 further comprising instructions to:

calculate coupling components for a coupling matrix using the acquired compensated signals; and perform one or more inversion operations to generate formation parameters from the coupling matrix.

20. The system of claim 14, wherein the instructions to generate a geosignal include instructions to generate a geosignal phase and a geosignal attenuation.

* * * * *